United States Patent [19]

Trilla et al.

[11] Patent Number: 5,246,303
[45] Date of Patent: Sep. 21, 1993

[54] CONNECTOR DEVICE FOR METAL CABLES

[75] Inventors: Antonio Trilla, Barcelona; Victorino Solano, Sant Cugat Del Valles, both of Spain

[73] Assignee: Pujol Y Tarrago, S.A., Rubi, Spain

[21] Appl. No.: 768,065
[22] PCT Filed: Jun. 25, 1990
[86] PCT No.: PCT/ES90/00021
§ 371 Date: Sep. 26, 1991
§ 102(e) Date: Sep. 26, 1991
[87] PCT Pub. No.: WO92/00472
PCT Pub. Date: Jan. 9, 1992

[51] Int. Cl.[5] .............................. F16G 11/14
[52] U.S. Cl. ........................ 403/353; 403/302; 403/78; 403/212; 24/702; 24/590; 24/687
[58] Field of Search .......... 403/212, 78, 79, 300, 403/301, 302, 287, 284, 353, 274, 315, 165, 285, 291; 24/702, 590, 687, 115 A, 114.5, 116 A; 124/25.6, 90

[56] References Cited

U.S. PATENT DOCUMENTS

| | | | |
|---|---|---|---|
| 231,751 | 8/1880 | Bailey et al. | 403/78 X |
| 1,225,100 | 5/1917 | Aubrey | 403/78 X |
| 1,547,195 | 7/1925 | Arbon | 403/165 |
| 2,181,794 | 11/1939 | Schlytter | 24/114.5 X |
| 2,591,925 | 4/1952 | Erbe | 24/702 X |
| 2,849,771 | 9/1958 | Rohland | 403/212 |
| 3,636,594 | 1/1972 | Faivre | 403/353 X |
| 4,172,676 | 10/1979 | DeChant | 403/302 X |
| 4,678,360 | 7/1987 | Miller | 403/78 X |
| 4,850,084 | 7/1989 | Iwasaki | 403/353 X |

FOREIGN PATENT DOCUMENTS 177415 11/1982 Japan ...................... 403/291

Primary Examiner—Randolph A. Reese
Assistant Examiner—Harry C. Kim
Attorney, Agent, or Firm—Michael J. Striker

[57] ABSTRACT

A connector device for metal cables has a connector member and a coupling terminal, the connector member and the coupling terminal being attachable to corresponding free ends of different portions of a metal cable, the connector member including a main body having a hollow structure and provided with retaining slot for the coupling terminal and also a clamping bushing, the coupling terminal being formed as a solid connector body.

2 Claims, 1 Drawing Sheet

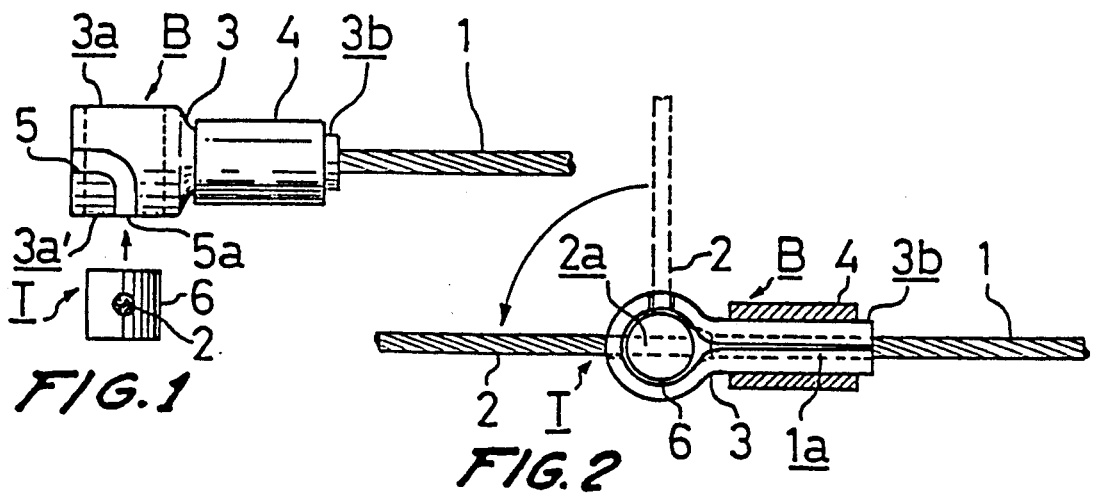
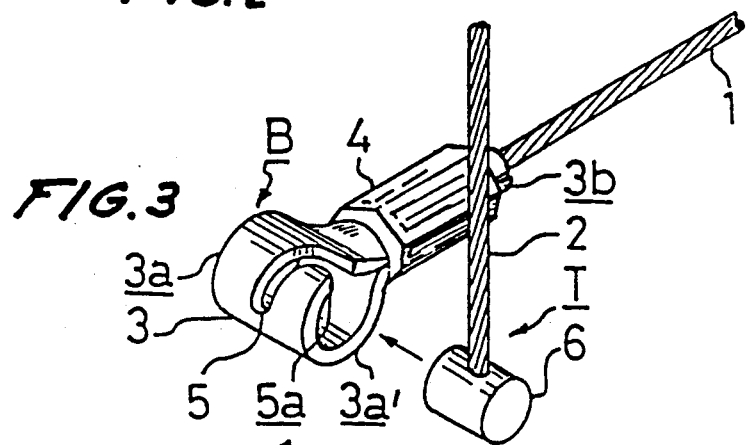
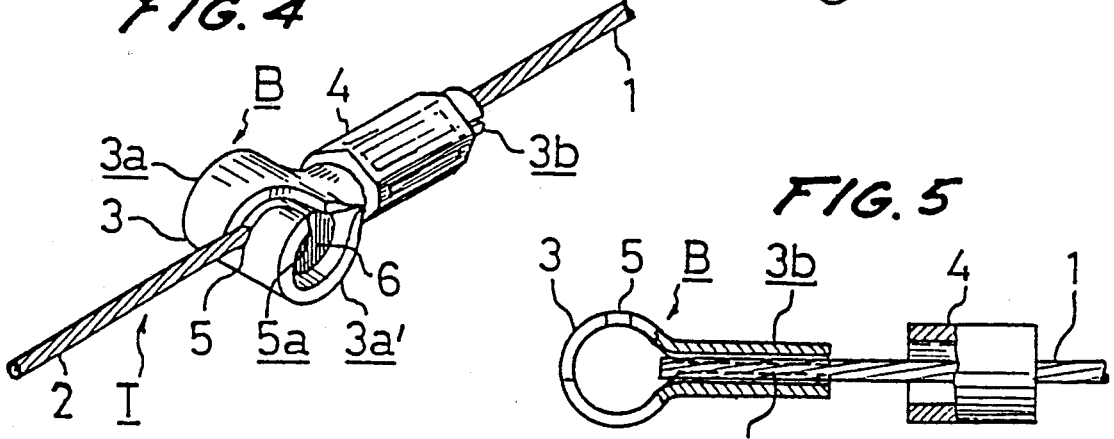
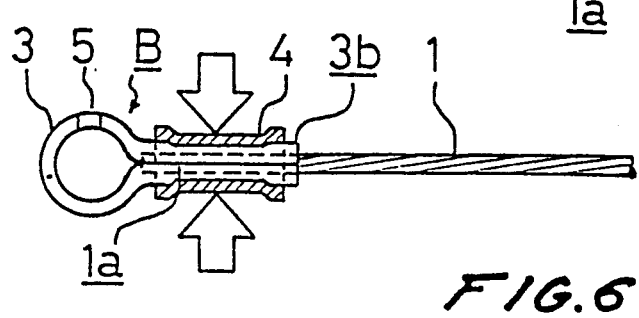

CONNECTOR DEVICE FOR METAL CABLES

BACKGROUND OF THE INVENTION

The present invention relates to a connector device for metal cables, particularly applicable to metal control cables which are used without a protective sheath in the motor industry.

The use of metal cables, with or without a protective sheath, for the transmission of force from the control mechanism of motor vehicles is widespread. As a particular case, there is cited the metal cable connecting the actuating mechanism of the vehicle parking brake, also known as emergency brake and handbrake, with the brake mechanism as such which, unlike the footbrake, is actuated once the vehicle has come to a stop. This metal linking cable is generally formed by a single stretch of cable provided at both free ends thereof with the corresponding terminals, adapted to each particular application and which are connected to the said mechanisms. The current trends in vehicle manufacturing processes impose the need for said metal cable to be formed by two independent portions of cable which may be installed and connected together in different stages of the vehicle assembly process. Furthermore the fact that the metal linking cable is formed by a single portion requires the replacement of the whole cable in the case of breakage or wear, which involves a financial cost in any case higher than the cost of replacing a single portion of cable if the link between the said mechanisms were formed by two independent cable portions.

Spanish patent P8803454, "Connector device for two control semicables" discloses a device having a tubular retaining body housing the ends of two portions of metal cable provided with corresponding terminals which may be coupled together. Nevertheless, this solution is rather complicated in manufacturing and assembly, requires an additional mechanical security member and is relatively expensive.

SUMMARY OF THE INVENTION

Accordingly, it is an object of the present invention to provide an connector device for metal cables, particularly for connecting two portions of a metal cable which connects together an actuating mechanism of a vehicle parking brake, which provides ease of assembly and low cost.

In keeping with these objects and with others which will become apparent hereinafter, one feature of the present invention resides, briefly stated, in a connector device which includes a connector member and a coupling terminal which are firmly attached to corresponding free ends of different portions of metal cable, and the connector member being formed by a main body of hollow structure provided with retaining means for the coupling terminal and by a clamping bushing, while the coupling terminal is formed by a solid connector body.

It is a further feature of the connector device for metal cables of the invention that the main body forming the connector member is made in a single piece and is T-shaped. The arms of said T define a tubular housing for receiving the coupling terminal and comprise the retaining means for said coupling terminal, while the extension of the main body which is perpendicular to said arms defines in turn a longitudinal housing which locates one end of the cable portion thereof. The metal cable end portion is firmly attached to the main body by the action of a clamping bushing concentrically disposed around said main body extension.

The connector device for metal cables of the invention is also characterised in that the coupling terminal retaining means, with which the main body of the connector member is provided, is formed by a slot passing through the wall of the tubular housing in an angular fashion and open at one of the ends thereof. The slot has a width slightly greater than the diameter of the metal cable portion to which the coupling terminal is attached, to slide snugly therealong until said terminal attains the final position of connection.

It is a further feature of the connector device for metal cables of the invention that the coupling terminal is formed by an essentially cylindrical solid connector body, the dimensions of which correspond snugly with those of the tubular housing formed in the connector member main body. The solid connector body is firmly attached to one end of the metal cable portion thereof, so that the respective axes of the solid connector body and of the metal cable portion are mutually perpendicular.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a front view of a connector device of the invention, showing its component parts separated from each other.

FIG. 2 is a side view of the connector device of the invention, partly in section, showing its component parts connected together.

FIGS. 3 and 4 are perspective views of the connector of the invention, showing the component parts in different stages of connection.

FIGS. 5 and 6 are side views, partly in section, showing different stages of assembly of the connector device of the invention.

DESCRIPTION OF THE PREFERRED EMBODIMENT

The connector device for metal cables of a invention described here as an embodiment is formed by a connector member B and by the coupling terminal T, which are firmly attached to corresponding free ends 1a and 2a of different portions of metal cables 1 and 2, respectively.

The connector member B is formed by a main body 3 and by a clamping bushing 4. The both members are made from a material appropriate for the intended use and purpose, preferably of steel, as is perfectly reflected in FIG. 1 of the attached sheet of drawings corresponding to this embodiment.

In this embodiment, the main body 3 forming the connector member B is made from sheet steel which, suitably formed by successive curving operations, takes on the T shape shown in FIGS. 1, 3 and 4.

In this T-shaped main body 3, arms 3a and 3a' define a through housing of generally cylindrical section where, as shown in FIGS. 2 and 4 the coupling terminal T may be snugly housed.

Furthermore, the extension 3b of the T-shaped main body 3 forming the connector member B, is perpendicular to both arms 3a. It 3a' and defines in turn a generally cylindrical through housing which may house the free end 1a of the metal cable portion 1 to an appropriate extent, which is shown in FIG. 5.

FIGS. 5 and 6 are detailed showings of the components forming the connector member B in two different stages of the process followed for assembly thereof in the embodiment described herein. FIG. 5 shows the free end 1a of the metal cable portion 1 housed in the extension 3b of the main body 3 and the clamping bushing 4 which may be snugly concentrically slid over said extension 3b. FIG. 6 shows the clamping bushing 4 in the final position on the extension 3b of the main body 3. The assembly formed by the free end 1a of the metal cable portion 1, the extension 3b of the main body 3 and the clamping bushing 4 is simultaneously subjected to compression forces, so that the result of said compression is an extraordinarily firm connection of the metal cable portion 1 to the connector member B.

In the embodiment described herein of the device of the invention, the means for retaining the coupling terminal T once connected to the connector member B is formed by an angularly disposed slot 5. The slot is open at its one ends 5a and along which the metal cable portion 2, to which the coupling terminal T is attached, may snugly slide.

The coupling terminal T is formed by a generally cylindrical connector body 6. The body, like the remaining component parts of the device of the invention is preferably made from steel and its dimensions are such as to allow it to be inserted snugly in the through housing defined by the arms 3a and 3a' of the T-shaped main body 3. The draw connector body 6 is firmly attached to the free end 2a of the metal cable portion 2, as shown in detail in FIGS. 1, 2, 3 and 4.

The use of the connector device for metal cables of the invention is extremely simple. This facilitates to a greater extent the coupling operations of the two independent metal cable portions 1 and 2 forming the link between the actuating mechanism of the vehicle parking or emergency brake with the brake mechanism as such. The metal cable portion 1 having the connector member B at the free end 1a thereof is mounted in the vehicle in the first place, in keeping with the vehicle assembly requirements since the mechanical connection effect is obviously independent of the metal cable portion considered. The metal cable portion 2 having the coupling terminal T at its free end 2a thereof is mounted in the vehicle at a later stage of said assembly process.

For connecting both portions of metal cable 1 and 2 together, one portion of the connector body 6 of the coupling terminal T is simply inserted in the housing formed in the main body 3, which housing is defined by the arms 3a and 3a'. At the same time the metal cable portion 2 is aligned with the free end 5a of the slot 5. By sliding said metal cable portion 2 along the slot 5 while rotating it in 90° the coupling terminal T may reach the final coupled position in which the longitudinal axes of both metal cable portions 1 and 2 are aligned, as shown in FIGS. 3 and 4. In this way, with this coupling position which corresponds to the operating position of both metal cable portions 1 and 2, untimely uncoupling of the coupling terminal T from the connector member B is made impossible, thereby ensuring the continuity of the said linking cable. The security is furthermore additionally increased by the fact that said link formed by the independent metal cable portions 1 and 2 is subjected under normal operating conditions to a pulling force making accidental disconnection of the component parts of the device of the invention even more impossible.

It will be understood that each of the elements described above, or two or more together, may also find a useful application in other types of constructions differing from the types described above.

While the invention has been illustrated and described as embodied in a connecting device for metal cables, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A connector device for connecting first and second metal cables each having free ends, comprising a connector member; and a coupling terminal, said connector member and said coupling terminal being attachable to the free ends of said first and second metal cables, respectively, said connector member including a main body having a hollow structure and provided with a retaining means for said coupling terminal and also a clamping bushing, said coupling terminal being formed as a solid connector body, said main body being a single piece integral element which is T-shaped and has arms defining a tubular housing having a through hole for receiving and retaining said coupling terminal, said main body also having an extension which is perpendicular to said arms and define a longitudinal housing for receiving said first metal cable free end, so that the first metal cable free end is firmly attached to said main body by action of said clamping bushing which is concentrically disposed around said extension, and said retaining means being formed as a slot extending through a wall of said tubular housing in an angular fashion with respect to the longitudinal housing and open at one end of said tubular housing, said slot having a width which is slightly greater than a diameter of said second metal cable to which said coupling terminal is attached, to slide snugly until said coupling terminal attains a first position of connection.

2. A connector as defined in claim 1, wherein said solid connector body is cylindrical and has dimensions snugly corresponding to dimensions of said tubular housing, said solid connector body being attachable to said second metal cable free end so that longitudinal axes of said solid connector body and said second metal cable are mutually perpendicular.

* * * * *